United States Patent
Nelson

(10) Patent No.: US 10,580,410 B2
(45) Date of Patent: Mar. 3, 2020

(54) TRANSCRIPTION OF COMMUNICATIONS

(71) Applicant: Sorenson IP Holdings, LLC, Salt Lake City, UT (US)

(72) Inventor: Craig Nelson, Midvale, UT (US)

(73) Assignee: Sorenson IP Holdings, LLC, Salt Lake City, UT (US)

(*) Notice: Subject to any disclaimer, the term of this patent is extended or adjusted under 35 U.S.C. 154(b) by 3 days.

(21) Appl. No.: 15/964,661

(22) Filed: Apr. 27, 2018

(65) Prior Publication Data

US 2019/0333517 A1 Oct. 31, 2019

(51) Int. Cl.
*G10L 15/00* (2013.01)
*G10L 15/26* (2006.01)
*H04M 3/22* (2006.01)
*G06K 9/00* (2006.01)

(52) U.S. Cl.
CPC .......... *G10L 15/26* (2013.01); *G06K 9/00288* (2013.01); *H04M 3/2218* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 7,920,158 B1* | 4/2011 | Beck | H04N 5/23219 348/14.08 |
| 8,645,134 B1* | 2/2014 | Harrenstien | G10L 15/26 704/235 |
| 9,451,072 B1 | 9/2016 | Willis et al. | |
| 9,606,767 B2 | 3/2017 | Corfield | |
| 9,704,486 B2 | 7/2017 | Basye et al. | |
| 2007/0011012 A1 | 1/2007 | Yurick et al. | |
| 2011/0112832 A1* | 5/2011 | Prorock | G11B 27/36 704/235 |
| 2012/0078626 A1 | 3/2012 | Tsai et al. | |
| 2012/0323579 A1* | 12/2012 | Gibbon | G10L 15/1822 704/270 |
| 2013/0300939 A1* | 11/2013 | Chou | G06K 9/00765 348/700 |
| 2015/0149169 A1 | 5/2015 | Chang | |

(Continued)

FOREIGN PATENT DOCUMENTS

CN 106385548 A 2/2017

*Primary Examiner* — Jesse S Pullias
(74) *Attorney, Agent, or Firm* — Maschoff Brennan

(57) ABSTRACT

A system may include a camera configured to obtain an image of a user, at least one processor, and at least one non-transitory computer-readable media communicatively coupled to the at least one processor. The non-transitory computer-readable media configured to store one or more instructions that when executed cause or direct the system to perform operations. The operations may include establish a communication session between the system and a device. The communication session may be configured such that the device provides audio for the system. The operations may further include compare the image to a particular user image associated with the system and select a first method of transcription generation from among two or more methods of transcription generation based on the comparison of the image to the particular user image. The operations may also include present, a transcription of the audio generated using the selected first method of transcription generation.

20 Claims, 6 Drawing Sheets

(56) References Cited

U.S. PATENT DOCUMENTS

| | | |
|---|---|---|
| 2015/0206535 A1 | 7/2015 | Iwai |
| 2016/0005146 A1 | 1/2016 | Thurling |
| 2017/0125019 A1 | 5/2017 | Ganesan et al. |
| 2017/0193996 A1 | 7/2017 | Zurek et al. |

\* cited by examiner

TRANSCRIPTION OF COMMUNICATIONS

FIELD

The embodiments discussed herein are related to transcriptions of communications.

BACKGROUND

Transcriptions of audio communications between people may assist people that are hard-of-hearing or deaf to participate in the audio communications. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A system may include a camera configured to obtain an image of a user associated with the system. The system may also include at least one processor coupled to the camera and configured to receive the image from the camera and at least one non-transitory computer-readable media communicatively coupled to the at least one processor. The non-transitory computer-readable media configured to store one or more instructions that when executed by the at least one processor cause or direct the system to perform operations. The operations may include establish a communication session between the system and a device. The communication session may be configured such that the device provides audio for the system. In these and other embodiments, the image of the user may be obtained after the communication session is established. The operations may further include compare the image to a particular user image associated with the system and select a first method of transcription generation from among two or more methods of transcription generation based on the comparison of the image to the particular user image. The operations may also include present, to the user, a transcription of the audio. The transcription of the audio may be generated using the selected first method of transcription generation.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
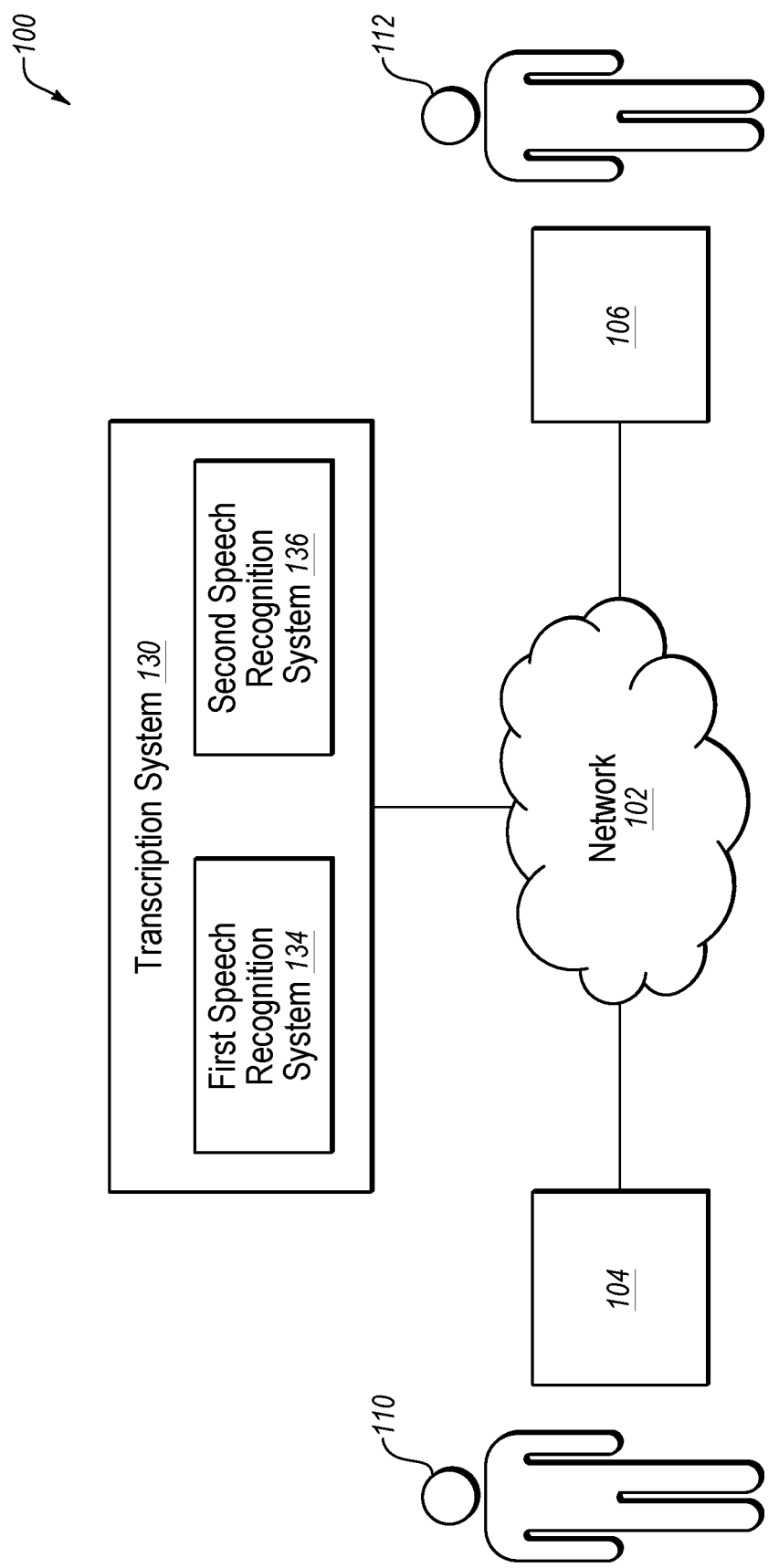
FIG. 1 illustrates an example environment for transcription of communications.

Some embodiments in this disclosure relate to systems and methods that may be configured to transcribe audio of a communication session. For example, in some embodiments, audio of a communication session may be provided to a transcription system to transcribe the audio from a device that receives and/or generates the audio. A transcription of the audio generated by the transcription system may be provided back to the device for display to a user of the device. The transcription may assist the user to better understand what is being said during the communication session.

In some embodiments, different methods of transcription generation may be used to generate a transcription of the audio. A particular method of transcription generation may be selected from among the different methods of transcription generation based on a user participating in the communication session. The system may determine a user that is participating in the communication session based on comparing an image of the user participating in the communication session with images of one or more users previously stored on the system.

The system may select a particular method of transcription generation from among multiple different methods of transcription generation based on the comparison of the image of the user participating in the communication session with the images of the one or more users previously stored on the system. The selected particular method of transcription generation may then be used to generate a transcription of the audio of the communication session. The transcription may be presented to the user.

In some embodiments, the method of transcription generation being used during the communication session may change. For example, during the communication session, a system may capture another image of a user participating in the communication session. The system may compare the other image with the images of the one or more users previously stored on the system. Based on the comparison, the system may select another method of transcription generation from among the multiple different methods of transcription generation.

In some embodiments, a first method of transcription generation may be different from a second method of transcription generation based on how the transcription generation is performed. For example, the first method of transcription generation may include generation of the transcription by a fully machine based automatic speech recognition system. Fully machine based ASR systems may operate without human intervention and may be referred to in this disclosure as automatic systems. Alternatively or additionally, the second method of transcription generation may include generation of the transcription by a re-voicing transcription system. Alternatively or additionally, another method of transcription generation may include automatically presenting the transcription based on the comparison of the image of the user and the images of the one or more users previously stored on the system. Alternatively or additionally, another method of transcription generation may include presenting the transcription in response to obtaining a request to present a transcription from the user.

Re-voicing transcription systems, referred to in this disclosure as re-voicing systems, may receive and broadcast audio to a captioning agent. The captioning agent may listen to the broadcast and speaks the words from the broadcast. The words spoken by the captioning agent are captured to generate re-voiced audio. The re-voiced audio may be used by a speech recognition program that is trained to the voice of the captioning agent to generate the transcription of the audio.

The systems and methods to select between different methods of transcription generation described in this disclosure may result in the improved display of transcriptions at a user device. For example, the systems and methods described in this disclosure may provide users with different user experiences based on user participating in a communication session. Thus, this disclosure may improve technology with respect to audio transcriptions and real-time generation and display of audio transcriptions.

Turning to the figures, FIG. 1 illustrates an example environment 100 for transcription of communications. The environment 100 may be arranged in accordance with at least one embodiment described in the present disclosure. The environment 100 may include a network 102, a first device 104, a second device 106, and a transcription system 130. The transcription system 130 may include a first speech recognition system 134 and a second speech recognition system 136.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a conventional type network, a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

Each of the first and second devices 104 and 106 may be any electronic or digital computing device. For example, each of the first and second devices 104 and 106 may include a desktop computer, a laptop computer, a smartphone, a mobile phone, a tablet computer, a telephone, a phone console, a caption device, a captioning telephone, or any other computing device that may be used for communication between users of the first and second devices 104 and 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first and second devices 104 and 106 may be configured to establish communication sessions with other devices. For example, each of the first and second devices 104 and 106 may be configured to establish an outgoing communication session, such as a telephone call, video call, or other communication session, with another device over a telephone line or network. For example, each of the first device 104 and the second device 106 may communicate over a wireless cellular network, a wired Ethernet network, an optical network, or a POTS line.

In some embodiments, each of the first and second devices 104 and 106 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the first device 104 may be configured to obtain first audio from a first user 110. For example, the first device 104 may obtain the first audio from a microphone of the first device 104 or from another device that is communicatively coupled to the first device 104.

The second device 106 may also be configured to obtain second audio from a second user 112. In some embodiments, second device 106 may obtain the second audio from a microphone of the second device 106 or from another device communicatively coupled to the second device 106. During the communication session, the first device 104 may provide the first audio for the second device 106. Alternatively or additionally, the second device 106 may provide the second audio for the first device 104. One or both of the first device 104 and the second device 106 may be configured to provide the first audio, the second audio, or both the first audio and the second audio to the transcription system 130.

In some embodiments, each of the first and second devices 104 and 106 may be configured to obtain images of users of the first and second devices 104 and 106. For example, each of the first device 104 and the second device 106 may include a camera. The camera of the first device 104 may capture an image of the first user 110. The camera of the second device 106 may capture an image of the second user 112. In these and other embodiments, the images of the users may be obtained before a communication session between the first device 104 and the second device 106.

In some embodiments, each of the first and second devices 104 and 106 may be configured to obtain images of users of the first and second devices 104 and 106 during communication sessions between the first device 104 and the second device 106. In these and other embodiments, each of the first and second devices 104 and 106 may compare the images captured during the communication sessions with the previously captured images. For example, each of the first and second devices 104 and 106 may compare the images captured during the communication sessions with the previously captured images using image comparison techniques. Based on the comparison, each of the first and second devices 104 and 106 may select and direct a particular method of transcription generation from among multiple different methods of transcription generation.

In these and other embodiments, each of the first and second devices 104 and 106 may capture multiple different images during the communication session. For one or more of the images captured, each of the first and second devices 104 and 106 may compare the images to previously captured images. Based on the comparison, each of the first and second devices 104 and 106 may select and direct a different one of the multiple different methods of transcription generation. As a result, each of the first and second devices 104 and 106 may direct one or more methods of transcription generation during one communication session between the first device 104 and the second device 106.

In some embodiments, the methods of transcription generation may include providing the audio to the transcription system 130. In these and other embodiments, the transcription system 130 may be configured to generate a transcription of the audio received from either one or both of the first device 104 and the second device 106. The transcription system 130 may also provide the generated transcription of the audio to either one or both of the first device 104 and the second device 106. Either one or both of the first device 104 and the second device 106 may be configured to present the transcription received from the transcription system 130. For example, the first device 104 may be configured to a display the received transcriptions on a display that is part of the first device 104 or that is communicatively coupled to the first device 104.

The transcription system 130 may be configured to generate a transcription of audio using the first speech recognition system 134 and/or the second speech recognition system 136. In some embodiments, each of the transcription system 130, the first speech recognition system 134, and the second speech recognition system 136 may include any configuration of hardware, such as processors, servers, and database servers that are networked together and configured to perform a task. For example, each of the transcription system 130, the first speech recognition system 134, and the second speech recognition system 136 may include one or multiple computing systems, such as multiple servers that each include memory and at least one processor.

The first speech recognition system 134 and the second speech recognition system 136 may each be configured to generate transcriptions from audio. In these and other embodiments, both the first speech recognition system 134 and the second speech recognition system 136 may be configured to recognize speech in the audio. Based on the recognized speech, the first speech recognition system 134 and the second speech recognition system 136 may output a transcription of the speech. The transcription may be a written version of the speech in the audio.

In some embodiments, the first speech recognition system 134 and the second speech recognition system 136 may be similar speech recognition systems. For example, in some embodiments, the first speech recognition system 134 and the second speech recognition system 136 may both be automatic systems that automatically recognize speech independent of human interaction to generate the transcription. In these and other embodiments, the first speech recognition system 134 and the second speech recognition system 136 may include speech engines that are trained to recognize speech. The speech engines may be trained for general speech and not specifically trained using speech patterns of the participants in the communication session, e.g., the first user 110 or the second user 112. Alternatively or additionally, the speech engines may be specifically trained using speech patterns of one of the participants of the communication session. Alternatively or additionally, both of the first speech recognition system 134 and the second speech recognition system 136 may be re-voicing systems.

In some embodiments, the first speech recognition system 134 and the second speech recognition system 136 may be different speech recognition systems. For example, in some embodiments, one of the first speech recognition system 134 and the second speech recognition system 136 may be an automatic system and another may be a re-voicing system.

In some embodiments, the methods of transcription generation directed by the first device 104 and/or the second device 106 may include the use of different speech recognition systems. For example, a first method of transcription generation may include the use of the first speech recognition system 134 and a second method of transcription generation may include the use of the second speech recognition system 136.

Alternatively or additionally, the methods of transcription generation may include different operations before presentation of a transcription. For example, a first method of transcription generation may include automatically providing audio from the first device 104 to the transcription system 130 and presenting a transcription from the transcription system 130 by the first device 104. A second method of transcription generation may include providing a selectable element to the first user 110, obtaining a response based on an interaction with the selectable element, and in response to the response based on the interaction, providing audio from the first device 104 to the transcription system 130, and presenting a transcription from the transcription system 130 by the first device 104. Alternatively or additionally, the methods of transcription may include combinations of the different operations before presentation of a transcription and uses of different speech recognition systems.

An example with respect to the environment 100 of FIG. 1 is now provided. A communication session may be established between the first device 104 and the second device 106. An image may be captured of the first user 110. The first device 104 may compare the image with a previously captured image. In response to the image matching the previously captured image, the first device 104 may select a first method of transcription generation. The first method of transcription generation may include providing audio from the second device 106 during the communication session to the transcription system 130 and directing the transcription system 130 to use the first speech recognition system 134 to generate the transcription of the audio. In these and other embodiments, the first speech recognition system 134 may be a re-voicing system.

In response to the image not matching the previously captured image, the first device 104 may select a second method of transcription generation. The second method of transcription generation may include providing audio from the second device 106 during the communication session to the transcription system 130 and directing the transcription system 130 to use the second speech recognition system 136 to generate the transcription of the audio. In these and other embodiments, the second speech recognition system 136 may be an automatic system.

Alternatively or additionally, the second method of transcription generation may include presenting a selectable element to the first user 110. The selectable element may provide the first user 110 the option to request a transcription of the audio from the second device 106. The first device 104 may obtain a request from the first user 110 for transcription of the audio based on interactions by the user with the selectable element. In response to the request for transcription of the audio, the audio from the second device 106 during the communication session may be provided to the transcription system 130 and the transcription system 130 may be directed to use the first speech recognition system 134 to generate the transcription of the audio. Alternatively or additionally, the transcription system 130 may be directed to use the second speech recognition system 136 to generate the transcription of the audio.

In some embodiments, after the transcription of the audio is presented to the first user 110 by the first device 104, the first device 104 may be configured to capture a second image of the first user 110. The first device 104 may compare the second image to a previously captured image. In these and other embodiments, in response to the second image not matching the previously captured image, the first device 104 may select another method of transcription generation rather than the first method of transcription generation previously implemented. In response to the selection, the other method of transcription generation may be implemented. The second image may not the match the previously captured image even though the first image may match the previously captured image in response to the first user 110 changing during the communication session. For example, a first person may be using the first device 104 at the beginning of the communication session. During the communication session, a second person may use the first device 104 in place of the first person. The second image may be of the second person. As a result, the other method of transcription generation may be implemented during the communication session. Alternatively or additionally, the second image may be of the same person as the first image. However, the person may have changed appearances during the call such that the second image of the person does not match the previously captured image. For example, the person may have put on glasses, as hat, or changed their appearance in another manner.

In these and other embodiments, the first device 104 or the second device 106 may provide the audio from the second device 106 to the transcription system 130. In some embodiments, the first device 104 may provide the image captured of the first user 110 to the transcription system 130. In these and other embodiments, the transcription system 130 may be configured to compare the image of the first user 110 to the previously captured image and select a method of transcription generation.

Modifications, additions, or omissions may be made to the environment 100 without departing from the scope of the present disclosure. For example, in some embodiments, the transcription system 130 may include additional functionality. For example, the transcription system 130 may edit the transcriptions or make other alterations to the transcriptions after presentation of the transcriptions one or both of the first device 104 and the second device 106.

Alternatively or additionally, in some embodiments, the environment 100 may include additional devices. In these and other embodiments, the additional devices may be configured to capture images and/or present communications as described in this disclosure. For example, the first device 104 may receive a request for a communication from the second device 106. A third device may alert the first user 110 of the request and capture audio of the first user 110. Alternatively or additionally, a fourth device may capture an image of the first user 110 and a fifth device may present transcriptions to the first user 110. In these and other embodiments, each of the first device 104, the third device, the fourth device, and the fifth device may be associated with the first user 110, communicatively coupled, and coordinated to perform operations as described with respect to the first device 104 in this disclosure.

As another example, in some embodiments, the first speech recognition system 134 and the second speech recognition system 136 may share hardware, software, or other components. In these and other embodiments, the first speech recognition system 134 and the second speech recognition system 136 may not be completely separate systems. Rather, reference to the first speech recognition system 134 and the second speech recognition system 136 may refer to a manner in how the transcriptions are generated more than separate systems.

As another example, in some embodiments, the components of the transcription system 130 may be coupled over a network. For example, the first speech recognition system 134 may be coupled with second speech recognition system 136 over a network, such as the network 102.

Figure 2A:
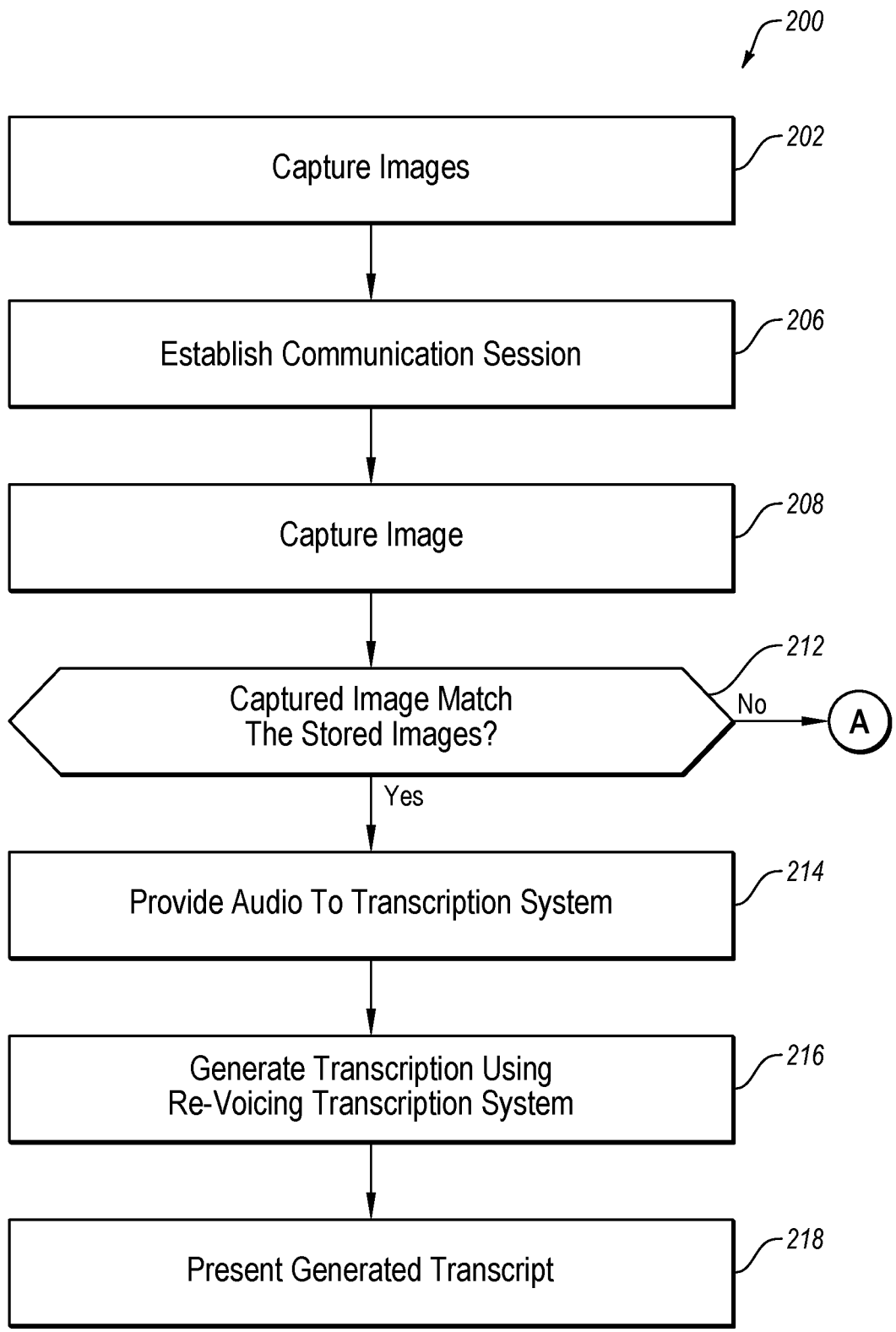
FIGS. 2a and 2b illustrate a flowchart of an example method to transcribe communications.
Figure 2B:
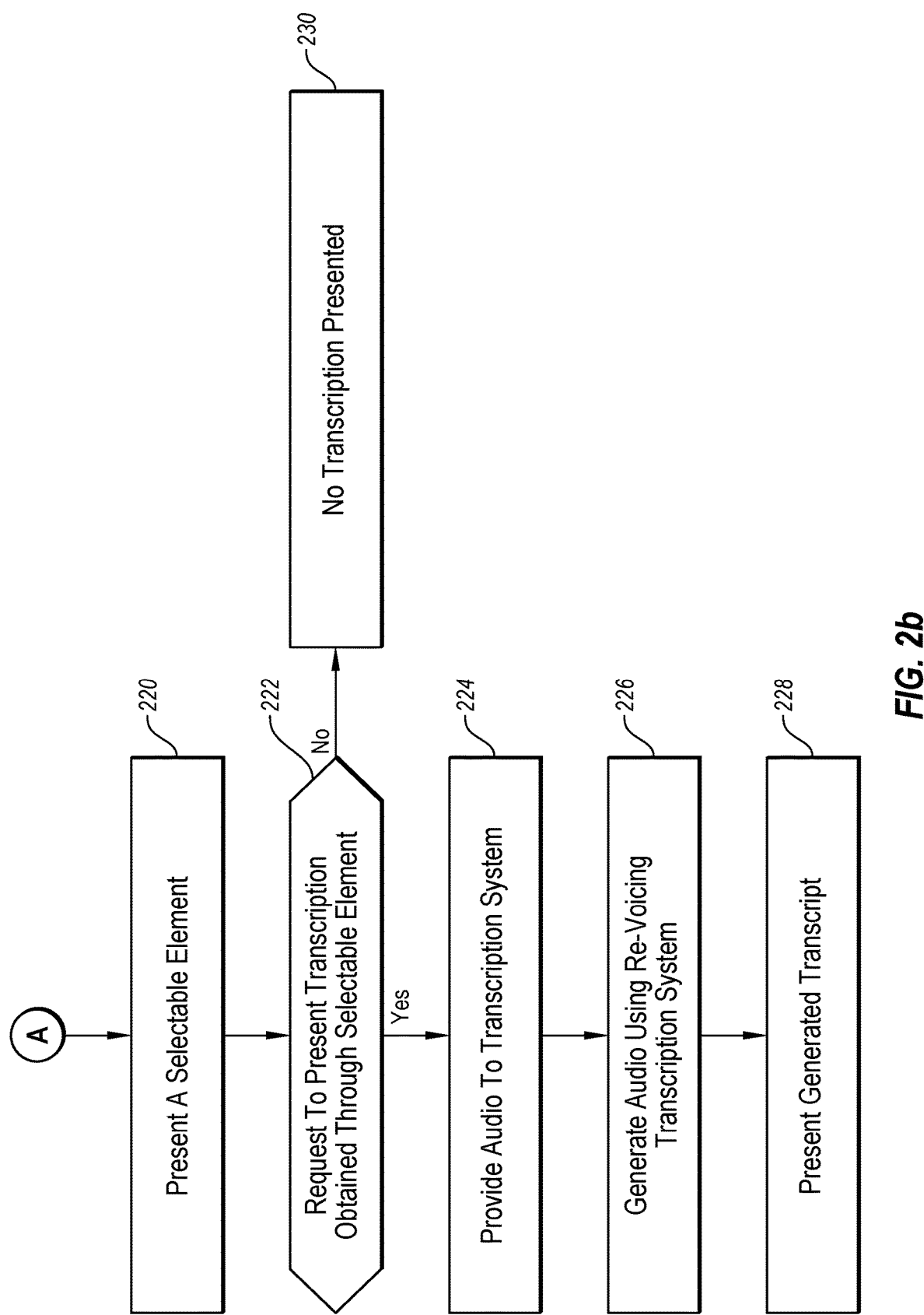

FIGS. 2*a* and 2*b* illustrate a flowchart of an example method 200 to transcribe communications. The method 200 may be arranged in accordance with at least one embodiment described in the present disclosure. The method 200 may be performed, in some embodiments, by a device or system, such as the first device 104 of FIG. 1 or the system 300 of FIG. 3, or another device or combination of devices. In these and other embodiments, the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 200 may begin at block 202, where an image of a user associated with a device may be captured. The image may be an image of a face of the user. In some embodiments, an image of each user associated with the device may be captured. For example, the device may include multiple user profiles. In these and other embodiments, an image of the user associated with each of the user profiles may be captured by the device. The captured images may be associated with the user profiles. The images of the user may be captured before a communication session. In some embodiments, the captured images of the users may be used by the device when selecting a type of method of transcription generation that may be implemented by the device. The images may be referred to as stored images with respect to FIGS. 2*a* and 2*b*.

At block 206, a communication session may be established. The communication session may be established to between the device and a second device. The communication session may include the second device providing audio to the device. The audio may be presented by the device, for example, the audio may be broadcast by a speaker of the device.

At block 208, in response to establishing the communication session, the device may capture an image of a user associated with the device. For example, the user may have directed the device to establish the communication session. For example, in a phone call, the user may have placed a phone call or answered a phone call. The device may capture the image of the user to determine the method of transcription generation to implement. The image may be a digital image captured by a camera. The image captured during the communication session may be referred to as the captured image with respect to FIGS. 2*a* and 2*b*.

At block 212, the captured image may be compared with the stored image to determine if the captured image matches the stored image. In some embodiments, the captured image may be compared with each of the stored images to determine if the captured image matches any of the stored images. The captured image may be compared with the stored image using image recognition techniques. When the captured image is determined to match one of the stored images, the method 200 may proceed to block 214. When the captured image is not determined to match any of the stored images, the method 200 may proceed to block 220.

In these and other embodiments, the captured image may be determined to match one of the stored images based on facial recognition techniques. For example, the captured image may match the stored image when a face of a user in the captured image matches a face of a user in the stored image. In these and other embodiments, the captured image may be determined to match one of the stored images even if the captured image does not perfectly match one of the stored images. For example, if a probability that the captured image matches one of the stored images is above a threshold probability, then it may be determined that the captured image matches one of the stored images. In these and other embodiments, the threshold probability may be 30, 50, 60, 70 or 80 percent, among other threshold probabilities.

At block 214, the audio from the communication session may be provided to a transcription system. The audio may be provided by the device to the transcription system in response to determining that the captured image matches the stored image.

At block 216, a transcription may be generated of the audio by the transcription system. The transcription may be generated using a re-voicing transcription system. The transcription may be generated in substantially real-time during the communication session. Substantially real-time as used in the present disclosure may include the transcription being generated within one to twenty seconds of the audio being received at the device during the communication session.

At block 218, the transcription may be presented by the device. In these and other embodiments, the transcription system may provide the generated transcription to the device. After receiving the generated transcription, the device may present the transcription. For example, the device may present the transcription on a display so that the transcription may be read by a user associated with the device. The transcription may be presented during the communication session in substantially real-time, such that there is a minimal delay between the audio broadcast by the device and the presentation of the corresponding portion of the transcription. The blocks 214, 216, and 218 may be an example of a first method to generate transcriptions that may be implemented. Implementing a method to generate transcriptions by a device may not the device performing all the steps to implement the method. Rather, implementing a method to generate transcriptions may include the device performing, directing the performance by another device/system, and/or indicating how certain steps may be performed by another device/system.

At block 220, a selectable element may be presented. In some embodiments, the selectable element may be presented in response to the captured image not matching the stored image. The selectable element may include a button, check box, or other element that may be selected by the user. Selection of the selectable element may indicate a request by the user for a transcription of the audio.

At block 222, it may be determined if a request to present a transcription is obtained through the selectable element. When a request is obtained, the method 200 may proceed to block 224. When a request is not obtained, the method 200 may proceed to block 230.

At block 224, the audio from the communication session may be provided to a transcription system. The audio may be provided by the device to the transcription system in response to determining that a request to present a transcription is obtained through the selectable element.

At block 226, a transcription may be generated of the audio by the transcription system. The transcription may be generated using a re-voicing transcription system.

At block 228, the transcription may be presented by the device. In these and other embodiments, the transcription system may provide the generated transcription to the device. After receiving the generated transcription, the device may present or direct the presentation of the transcription. The blocks 220, 222, 224, 226, 228, and 230 may be an example of a second method to generate transcriptions that may be implemented. The second method to generate transcriptions may include the generation of the transcription using the re-voicing transcription system. A third method to generate transcriptions may be similar to the second method expect the generation of the transcription may be performed using an automatic transcription system.

At block 230, no transcription of the audio of the communication session is presented.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 200 may further include a fourth method to generate transcriptions. In these and other embodiments, the blocks 220 and 222 may be removed and the transcription may be generated in block 226 using the automatic transcription system.

As another example, the method 200 may return to block 208 after block 218. In these and other embodiments, another image may be captured and the blocks following block 208 may be repeated during the communication session.

As another example, the method 200 may return to block 206 after the communication session. After the establishing a second communication session, the blocks following block 206 may be performed during the second communication session.

Figure 3:
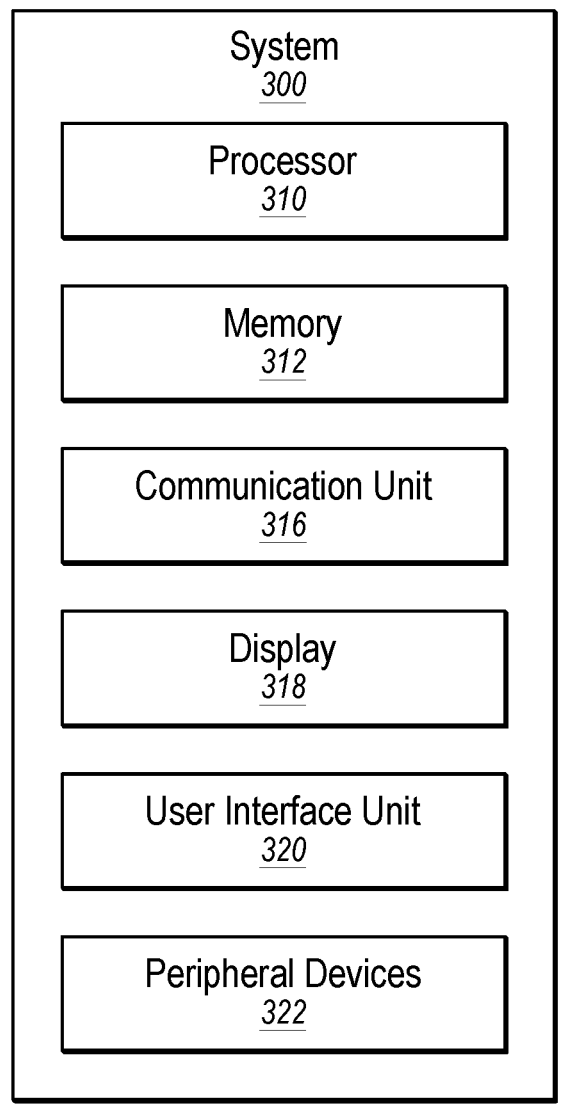
FIG. 3 illustrates an example system that may be used during transcription of communications.

FIG. 3 illustrates an example system 300 that may be used to provide indications with respect to questions of a communication session. The system 300 may be arranged in accordance with at least one embodiment described in the present disclosure. The system 300 may include a processor 310, memory 312, a communication unit 316, a display 318, a user interface unit 320, and a peripheral device 322, which all may be communicatively coupled. In some embodiments, the system 300 may be part of any of the systems or devices described in this disclosure.

For example, the system 300 may be part of the first device 104 of FIG. 1 and may be configured to perform one or more of the tasks described above with respect to the first device 104. As another example, the system 300 may be part of the second device 106 of FIG. 1 and may be configured to perform one or more of the tasks described above with respect to the second device 106. As another example, the system 300 may be part of the transcription system 120 of FIG. 1 and may be configured to perform one or more of the tasks described above with respect to the transcription system 160.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may execute the program instructions stored in the memory 312.

For example, in some embodiments, processor 310 may execute program instructions stored in the memory 312 that are related to providing indications with respect to questions of a communication session such that the system 300 may perform or direct the performance of the operations associated therewith as directed by the instructions. In these and other embodiments, instructions may be used to perform one or more operations of the methods 200, 400, or 500 of FIGS. 2a, 2b, 4, and 5.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 316 may permit data to be exchanged with a network and/or any other devices or systems described in the present disclosure. For example, when the system 300 is included in the first device 104 of FIG. 1, the communication unit 316 may allow the first device 104 to communicate with the transcription system 130.

The display 318 may be configured as one or more displays, like an LCD, LED, or other type of display. The display 318 may be configured to present video, text captions, user interfaces, and other data as directed by the processor 310. For example, when the system 300 is included in the first device 104 of FIG. 1, the display 318 may be configured to present second video from a second device, a transcript of second audio from the second device, and/or a selectable element.

The user interface unit 320 may include any device to allow a user to interface with the system 300. For example, the user interface unit 320 may include a mouse, a track pad, a keyboard, buttons, and/or a touchscreen, among other devices. The user interface unit 320 may receive input from a user and provide the input to the processor 310. In some embodiments, the user interface unit 320 and the display 318 may be combined.

The peripheral devices 322 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 300 or otherwise generated by the system 300.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described.

Figure 4:
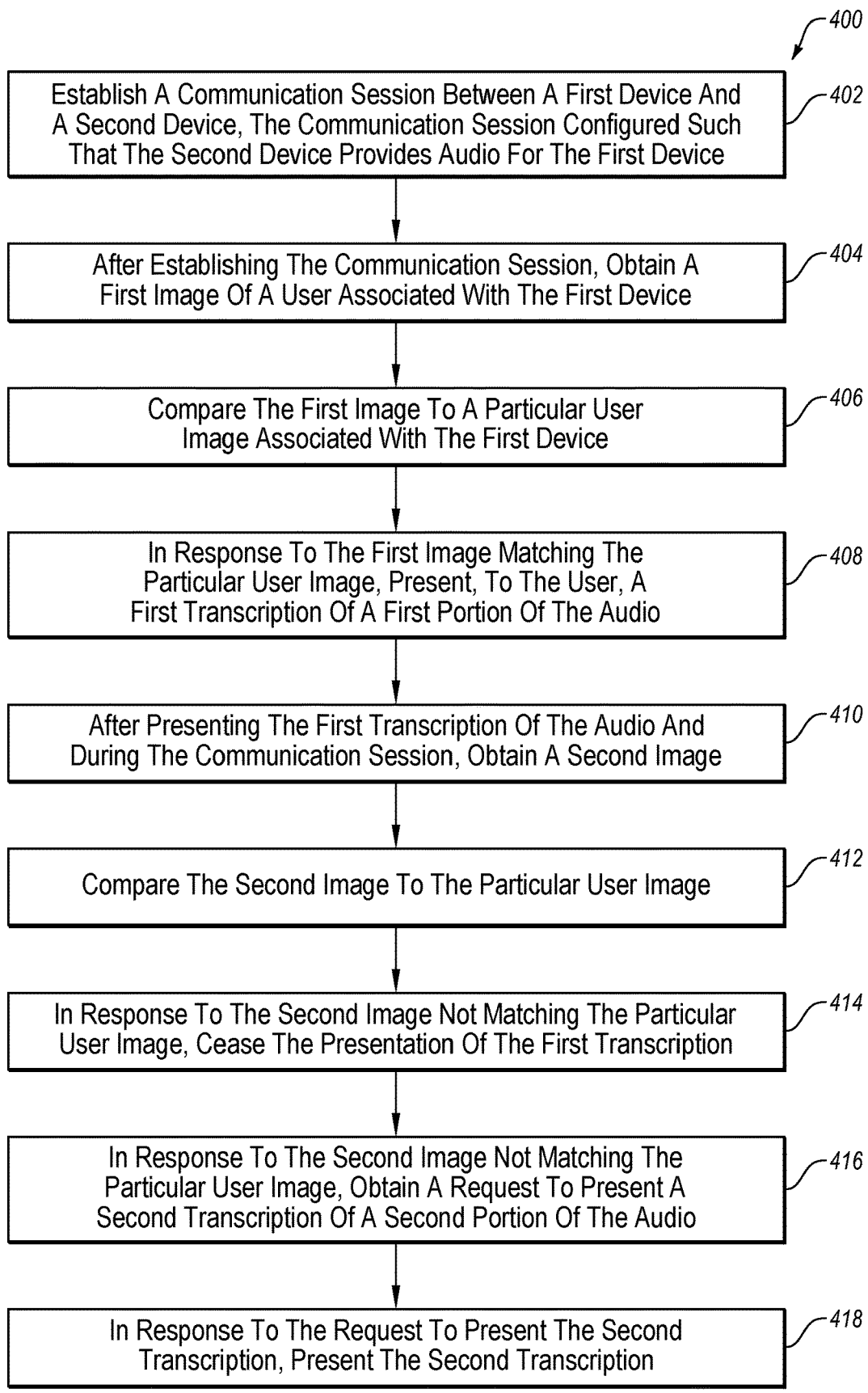
FIG. 4 is a flowchart of another example method to transcribe communications.

FIG. 4 is a flowchart of an example method 400 to transcribe communications. The method 400 may be arranged in accordance with at least one embodiment described in the present disclosure. The method 400 may be performed, in some embodiments, by a device or system, such as the first device 104 of FIG. 1 or the system 300 of FIG. 3, or another device or system. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, a communication session may be established between a first device and a second device. The communication session may be configured such that the second device provides audio for the first device.

At block 404, after establishing the communication session, a first image of a user associated with the first device may be obtained. At block 406, the first image may be compared to a particular user image associated with the first device.

At block 408, in response to the first image matching the particular user image, a first transcription of a first portion of the audio may be presented to the user. At block 410, after presenting the first transcription of the audio and during the communication session, a second image may be obtained. At block 412, the second image may be compared to the particular user image.

At block 414, in response to the second image not matching the particular user image, the presentation of the first transcription may cease. At block 416, in response to the second image not matching the particular user image, a request to present a second transcription of a second portion of the audio may be obtained. In these and other embodiments, the second portion of the audio may begin in response to the second image not matching the particular user image based on the comparison.

At block 418, in response to the request to present the second transcription, the second transcription is presented. In some embodiments, the first transcription may be generated using a first method of transcription generation and the second transcription may be generated using a second method of transcription generation different than the first method of transcription generation.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include in response to the first image matching the particular user image, providing the first portion of the audio to a transcription system configured to generate the first transcription and obtaining the first transcription from the transcription system. In these and other embodiments, in response to the second image not matching the particular user image, the method 400 may also include ceasing to provide the first portion of the audio to the transcription system. Alternatively or additionally, in response to the request to present the second transcription, the method 400 may also include providing the second portion of the audio to the transcription system and obtaining the second transcription from the transcription system.

In some embodiments, the method 400 may further include in response to the second image not matching the particular user image, presenting a selectable element in a graphic user interface. In these and other embodiments, the request to present the second transcription may be obtained based on interactions with the selectable element.

Figure 5:
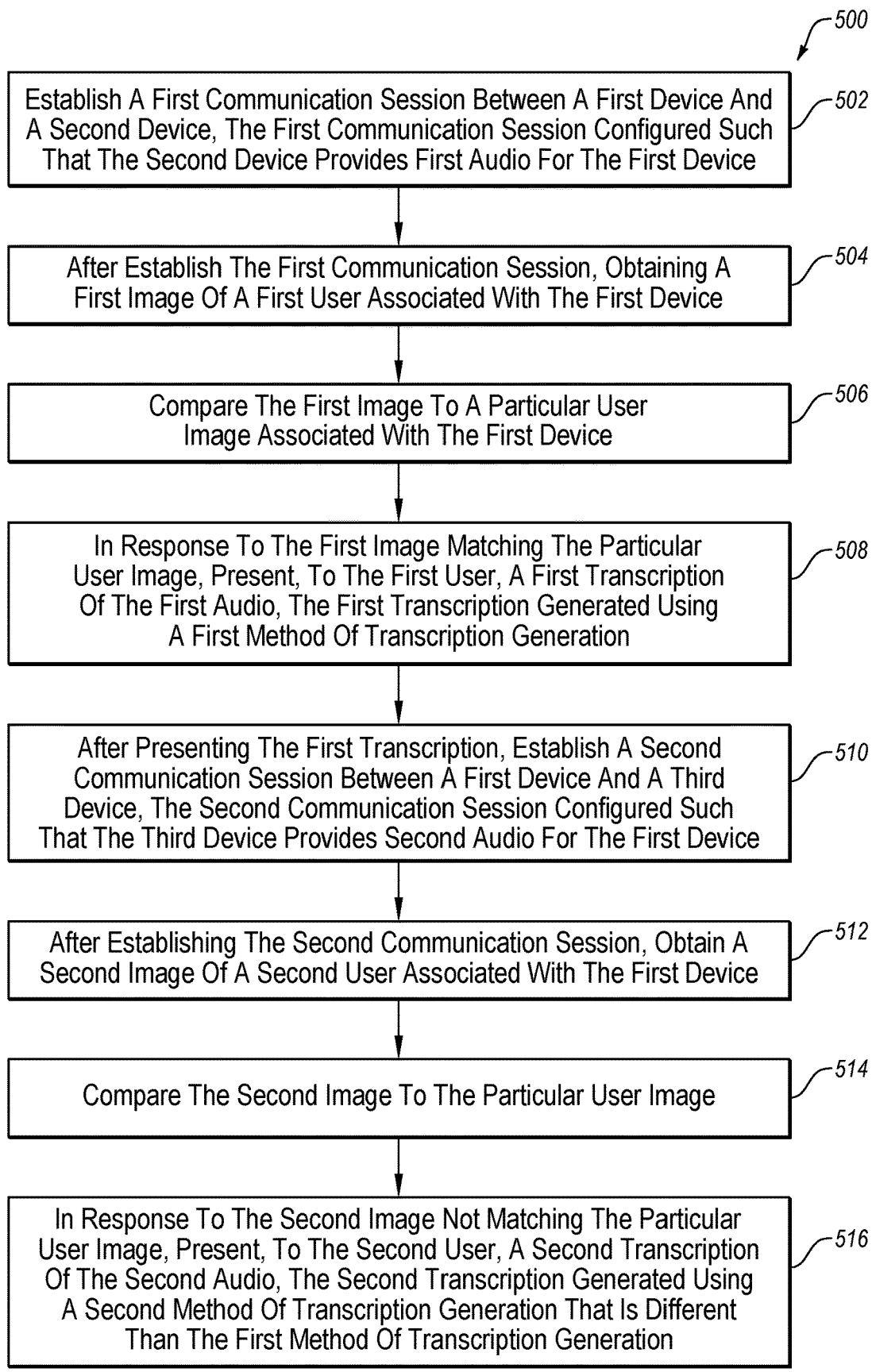
FIG. 5 is a flowchart of another example method to transcribe communications.

FIG. 5 is a flowchart of another example method 500 to transcribe communications. The method 500 may be arranged in accordance with at least one embodiment described in the present disclosure. The method 500 may be performed, in some embodiments, by a device or system, such as the first device 104 of FIG. 1 or the system 300 of FIG. 3, or another device or system. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where a first communication session may be established between a first device and a second device. The first communication session may be configured such that the second device provides first audio for the first device.

At block 504, after establishing the first communication session, a first image of a first user associated with the first device may be obtained. At block 506, the first image may be compared to a particular user image associated with the first device.

At block 508, in response to the first image matching the particular user image, a first transcription of the first audio may be presented to the first user. In these and other embodiments, the first transcription may be generated using a first method of transcription generation. The first method of transcription generation may include automated speech recognition independent of human interaction.

At block 510, after presenting the first transcription, a second communication session may be established between a first device and a third device. In these and other embodiments, the second communication session may be configured such that the third device provides second audio for the first device.

At block 512, after establishing the second communication session, a second image of a second user associated with the first device may be obtained. At block 514, the second image may be compared to the particular user image.

At block 516, in response to the second image not matching the particular user image, a second transcription of the second audio may be presented to the first user. In these and other embodiments, the second transcription may be generated using a second method of transcription generation that is different than the first method of transcription generation.

In these and other embodiments, the second method of transcription generation may include broadcasting the second audio and obtaining third audio based on a human re-voicing of the broadcasted second audio. In these and other embodiments, the second transcription may be generated based on the third audio.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include after presenting the first transcription and during the first communication session, obtaining a third image and comparing the third image to the particular user image. The method 500 may further include in response to the third image not matching the particular user image ceasing the presentation of the first transcription and presenting a third transcription of the first audio, the third transcription generated using the second method of transcription generation.

In some embodiments, the method 500 may further include after presenting the first transcription and during the first communication session, obtaining a third image and comparing the third image to the particular user image. The method 500 may further include in response to the third image not matching the particular user image ceasing the presentation of the first transcription and obtaining, at the first device, a request to present a third transcription of the first audio. In these and other embodiments, in response to the request to present the third transcription, the third transcription may be presented.

In some embodiments, the method 500 may further include in response to the first image matching the particular user image, providing the first audio to a first transcription system configured to generate the first transcription using the first method of transcription generation and obtaining the first transcription from the first transcription system. In these and other embodiments, the method 500 may further include in response to the second image not matching the particular user image, providing the second audio to a second transcription system configured to generate the second transcription using the second method of transcription generation and obtaining the second transcription from the second transcription system. In these and other embodiments, the first transcription system and the second transcription system may be the same system that implements both the first method of transcription generation and the second method of transcription generation.

As indicated above, the embodiments described herein may include the use of a special purpose or general purpose computer (e.g., the processor 310 of FIG. 3) including various computer hardware or software modules, as discussed in greater detail below. Further, as indicated above, embodiments described herein may be implemented using computer-readable media (e.g., the memory 312 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method to transcribe communications, the method comprising:
obtaining a first image of a first user associated with a first device;
obtaining audio during a communication session between the first device and a second device, the audio originating at the second device and being based on speech of a second user of the second device;
comparing the first image of the first user associated with the first device to a particular user image associated with the first device;
in response to the first image matching the particular user image, presenting, to the first user associated with the first device, a first transcription of a first portion of the audio originating at the second device;
after presenting the first transcription of the audio and during the communication session, obtaining, by the first device, a second image;
comparing the second image to the particular user image;
in response to the second image not matching the particular user image:
ceasing the presentation of the first transcription of the first portion of the audio originating at the second device; and obtaining a request to present a second transcription of a second portion of the audio originating at the second device; and in response to the request to present the second transcription, presenting the second transcription.

2. The method of claim 1, further comprising in response to the first image matching the particular user image:

providing the first portion of the audio to a transcription system configured to generate the first transcription; and obtaining the first transcription from the transcription system.

3. The method of claim 2, further comprising:

in response to the second image not matching the particular user image, ceasing to provide the first portion of the audio to the transcription system; and in response to the request to present the second transcription:

providing the second portion of the audio to the transcription system; and obtaining the second transcription from the transcription system.

4. The method of claim 1, wherein the first transcription is generated using a first speech recognition system and the second transcription is generated using a second speech recognition system different than the first speech recognition system.

5. The method of claim 4, wherein the first speech recognition system and the second speech recognition system are each configured to use a different speech recognition engine to automatically recognize speech in audio independent of human interaction.

6. The method of claim 4, wherein the first speech recognition system is a re-voicing speech recognition system and the second speech recognition system automatically recognizes speech independent of human interaction.

7. At least one non-transitory computer-readable media configured to store one or more instructions that when executed by at least one processor cause or direct a system to perform the method of claim 1.

8. A method to transcribe communications, the method comprising:

obtaining first audio of a first communication session between a first device and a second device, the first communication session configured such that the first audio originates at the second device and the second device provides the first audio for the first device;

obtaining a first image of a first user associated with the first device;

comparing the first image to a particular user image associated with the first device;

in response to the first image matching the particular user image, presenting, to the first user, a first transcription of the first audio, the first transcription generated using a first speech recognition system that includes a first speech engine trained to automatically recognize speech in audio;

after presenting the first transcription, obtaining second audio of a second communication session between the first device and a third device, the second communication session configured such that the second audio originates at the third device and the third device provides the second audio for the first device;

after presenting the first transcription, obtaining a second image of a second user associated with the first device;

comparing the second image to the particular user image; and in response to the second image not matching the particular user image, presenting, to the second user, a second transcription of the second audio, the second transcription generated using a second speech recognition system that includes a second speech engine trained to automatically recognize speech in audio, the second speech recognition system being different than the first speech recognition system, including the first speech engine being different than the second speech engine.

9. The method of claim 8, further comprising:

after presenting the first transcription and during the first communication session, obtaining a third image;

comparing the third image to the particular user image;

in response to the third image not matching the particular user image:

ceasing the presentation of the first transcription; and presenting a third transcription of the first audio, the third transcription generated using the second speech recognition system.

10. The method of claim 8, further comprising:

after presenting the first transcription and during the first communication session, obtaining a third image;

comparing the third image to the particular user image;

in response to the third image not matching the particular user image:

ceasing the presentation of the first transcription; and obtaining, at the first device, a request to present a third transcription of the first audio; and in response to the request to present the third transcription, presenting the third transcription.

11. The method of claim 10, wherein the third transcription is generated by the second speech recognition system.

12. The method of claim 8, wherein the first and second speech recognition systems both automatically recognize speech independent of human interaction.

13. The method of claim 8, wherein the first speech recognition system is configured to:

broadcasting the second audio; and obtaining third audio based on a human re-voicing of the broadcasted second audio, wherein the first transcription is generated by the first speech engine based on the third audio.

14. The method of claim 8, wherein the first speech recognition system is a re-voicing speech recognition system and the second speech recognition system automatically recognizes speech independent of human interaction.

15. At least one non-transitory computer-readable media configured to store one or more instructions that when executed by at least one processor cause or direct a system to perform the method of claim 8.

16. A system comprising:

a camera configured to obtain an image of a user associated with the system;

at least one processor coupled to the camera and configured to receive the image from the camera; and at least one non-transitory computer-readable media communicatively coupled to the at least one processor and configured to store one or more instructions that when executed by the at least one processor cause or direct the system to perform operations comprising:

establish a communication session between the system and a device, the communication session configured such that the device provides audio for the system, wherein the image of the user is obtained after the communication session is established;

compare the image to a particular user image associated with the system;

select a first speech recognition system from among two or more speech recognition systems based on the comparison of the image to the particular user image, each of the two or more speech recognition systems including a different speech engine trained to automatically recognize speech in audio; and present, to the user, a transcription of the audio, the transcription of the audio generated using the selected first speech recognition system.

17. The system of claim 16, wherein the transcription of the audio is a first transcription of a first portion of the audio, the operations further comprising:

after presenting the first transcription of the audio and during the communication session, obtain a second image;

compare the second image to the particular user image;

select a second speech recognition system from among the two or more speech recognition systems based on the comparison of the second image to the particular user image; and present, to the user, a second transcription of a second portion of the audio, the second transcription generated using the selected second speech recognition system.

18. The system of claim 16, wherein the first speech recognition system is selected from among two or more speech recognition systems based on the image not matching the particular user image and the first speech recognition system automatically recognizes speech independent of human interaction.

19. The system of claim 16, wherein the first speech recognition system is selected from among two or more speech recognition systems based on the image matching the particular user image and the first speech recognition system is configured to:

broadcasting the audio; and obtaining second audio based on a human re-voicing of the broadcasted audio, wherein the transcription is generated based on the second audio.

20. The system of claim 16, wherein the two or more speech recognition systems include at least: a speech recognition system that automatically recognizes speech independent of human interaction and a re-voicing speech recognition system.

* * * * *